(12) United States Patent
Graner et al.

(10) Patent No.: US 12,013,023 B2
(45) Date of Patent: Jun. 18, 2024

(54) DRIVE UNIT FOR A CONSTRUCTION AND/OR MATERIAL HANDLING MACHINE

(71) Applicant: Liebherr-Components Biberach GmbH, Biberach an der Riss (DE)

(72) Inventors: Klaus Graner, Biberach an der Riss (DE); Martin Paal, Biberach an der Riss (DE)

(73) Assignee: Liebherr-Components Biberach GmbH, Biberach an der Riss (DE)

( * ) Notice: Subject to any disclaimer, the term of this patent is extended or adjusted under 35 U.S.C. 154(b) by 0 days.

(21) Appl. No.: 18/052,356

(22) Filed: Nov. 3, 2022

(65) Prior Publication Data

US 2023/0151882 A1 May 18, 2023

Related U.S. Application Data

(63) Continuation of application No. PCT/EP2021/061047, filed on Apr. 28, 2021.

(30) Foreign Application Priority Data

| May 6, 2020 | (DE) | .................... | 10 2020 112 258.6 |
| Jun. 25, 2020 | (DE) | .................... | 10 2020 116 762.8 |

(51) Int. Cl.
| *F16H 57/04* | (2010.01) |
| *F16H 57/025* | (2012.01) |
| *F16H 1/28* | (2006.01) |
| *F16H 57/02* | (2012.01) |

(52) U.S. Cl.
CPC ....... *F16H 57/025* (2013.01); *F16H 57/0412* (2013.01); *F16H 57/0476* (2013.01); *F16H 1/28* (2013.01); *F16H 2057/02034* (2013.01); *F16H 2057/02073* (2013.01); *F16H 57/0486* (2013.01)

(58) Field of Classification Search
CPC ............... F16H 57/025; F16H 57/0412; F16H 57/0476; F16H 1/28; F16H 57/0486; F16H 2057/02034; F16H 2057/02073; F16H 57/02; B66D 1/225; B66D 1/28; B66D 1/12
See application file for complete search history.

(56) References Cited

U.S. PATENT DOCUMENTS

| 9,975,745 B2 * | 5/2018 | Hall | .................... B66D 1/56 |
| 10,618,782 B2 * | 4/2020 | Wang | .................... B66D 1/12 |

(Continued)

FOREIGN PATENT DOCUMENTS

| CN | 108046147 A | * | 5/2018 | ............... B66D 1/12 |
| CN | 108146144 A | * | 6/2018 | ......... B60B 27/0015 |
| CN | 109130839 A | * | 1/2019 | ............... B60B 1/06 |

(Continued)

*Primary Examiner* — Justin Holmes
(74) *Attorney, Agent, or Firm* — Levine Bagade Han LLP

(57) ABSTRACT

The invention relates to a drive unit for a construction and/or material handling machine or lifting equipment such as a crane, comprising a torque density of more than 20 Nm/l at a predetermined output speed, wherein the drive unit comprises a drive motor and a connected transmission, wherein a fast-running electric motor is provided as the drive motor, wherein the motor speed thereof is at least two times said output speed of the drive unit and is reduced by the transmission by a factor of at least 2 to the output speed of the drive unit.

19 Claims, 3 Drawing Sheets

(56) References Cited

U.S. PATENT DOCUMENTS

2011/0303886 A1  12/2011  Cryer et al.
2019/0341825 A1  11/2019  Gildner et al.

FOREIGN PATENT DOCUMENTS

| DE | 102009057240 | 6/2011 |
| DE | 112012006023 T5 | 2/2015 |
| DE | 102017219994 | 5/2019 |
| DE | 102018113319 | 12/2019 |
| DE | 102018117774 | 1/2020 |
| DE | 102018213593 | 2/2020 |
| EP | 1125885 | 3/2006 |
| WO | WO 2021/224075 | 11/2021 |

* cited by examiner

DRIVE UNIT FOR A CONSTRUCTION AND/OR MATERIAL HANDLING MACHINE

CROSS-REFERENCE TO RELATED APPLICATIONS

This application is a continuation of International Patent Application Number PCT/EP2021/061047 filed Apr. 28, 2021, which claims priority to German Patent Application Numbers DE 10 2020 112 258.6 filed May 6, 2020 and DE 10 2020 116 762.8 filed Jun. 25, 2020, the contents of which are incorporated herein by reference in their entireties.

BACKGROUND

The present invention relates to a drive unit for a construction and/or material handling machine or a lifting equipment such as a crane, comprising a torque density of more than 20 Nm/l at a predetermined output speed, wherein the drive unit comprises a drive motor and a connected transmission.

Drives of construction and/or material handling machines or lifting equipment such as cranes must provide high torques at relatively low speeds in order to lift or move heavy loads slowly or to move the typically very heavy machines. For example, when lifting heavy loads, crane hoisting winches have to start up very slowly while providing high torques in order to be able to lift and move the load smoothly. Similar requirements are also placed on the drives of construction machines such as mobile excavators, mobile cranes, crawler excavators, wheel loaders, dozers, concrete mixers or concrete pumps, or on material handling machines such as teleloaders or forklifts, whereas underground vehicles or machines generally used in the mining industry also require appropriate drives. Other mobile machinery such as municipal vehicles, for example in the form of sweepers, special tractors or waste collectors, as well as airport tractors, but also agricultural and forestry equipment, aerial work platforms or drilling equipment require drives that have to meet similar requirements.

In order to be able to provide high torques at low speeds and at the same time fit into the often confined installation space of the installation environment, up to now there have typically been used hydraulic drives, for example in the form of axial piston motors, which can be designed as constant or variable displacement motors. Such hydraulic motors fit into very confined installation spaces, such as inside the drum of a cable winch, and have a sufficiently high torque density at low output speeds. Such hydraulic motors for the above machine types usually have torque densities in the range of 30 to 40 Nm/l and can provide torques in the range of 500 to 1,000 Nm or 100 to 2,000 Nm at low speeds, although the above characteristics may vary depending on the hydrostat design and size.

Recently, attempts have been made to replace such hydraulic drives with electric drives in order to achieve the advantages provided by the electrification. Electrification has been known to be a trend that can serve a variety of purposes. On the one hand, the goal is fuel savings as a result of enhanced efficiency. On the other hand, the buzzword "Local Zero Emission" has also become prominent for construction machinery or material handling machines and lifting equipment, in order to operate on site without an internal combustion engine driving either a hydraulic pump or an electric generator. In this case, the electric drives can be fed from an energy accumulator such as a battery or, in certain applications such as mining, from the grid.

However, electric machines are not readily suitable for use in said machines due to their low power density, as the electric machine usually cannot satisfy all of said boundary conditions equally. In order to be able to provide sufficiently high power or torque, the electric motor would have to be built correspondingly larger, but this is not possible if the available installation space of the installation environment is limited or the electric motor is even to be installed as a replacement for a hydraulic drive with an otherwise unchanged machine environment. On the other hand, the power density of the electric motor cannot easily be increased by increasing the speed either, since the units to be driven, such as winches, axles or transmissions, cannot usually handle increased speeds straight away, at least not without structural adjustments. In particular, if a conventional hydraulic motor is to be replaced by an electric drive, the speeds of the drive unit cannot simply be increased, as the driven system would then no longer be able to operate in the predetermined manner.

SUMMARY

It is therefore the underlying object of the present invention to provide an improved drive unit of the named kind which avoids disadvantages of the prior art and further develops the latter in an advantageous manner. In particular, the aim is to create an exchange drive unit for replacement with a hydraulic drive that can be installed without extensive redesign of the system units to be driven and that meets the torque and speed requirements of the system units to be driven.

Said task is solved, according to the invention, with a drive unit as claimed in claim 1. Preferred embodiments of the invention are the subject-matter of the dependent claims.

It is therefore proposed to provide an electric motor as the drive motor that runs too fast per se, whose motor speed, which is too high for the required output speed, is reduced by a connected transmission to such an extent that the machine units to be driven, such as winches, axles or downstream transmissions, can continue to be used in their design intended for a hydraulic drive. According to the invention, the drive motor is a high-speed electric motor whose motor speed is at least twice the predetermined output speed of the drive unit and is reduced by a factor of at least 2 to the output speed of the drive unit by the transmission integrated in the drive unit. Advantageously, the high-speed electric motor and the speed-reducing transmission are combined in the manner of a plug-and-play module to form a drive unit that can be easily connected to the machine units to be driven as a replacement for a hydraulic motor, without the machine components to be driven having to be reconfigured or the person installing the unit having to worry about this.

Due to the high torque density of at least more than 20 Nm/l, which is achieved by the combination of a significantly too fast running electric motor with a significantly speed-reducing transmission according to the invention, the drive unit can also be installed in confined spaces of specified installation environments and at the same time provide high torques at low speeds, as required by classic construction and/or material handling machines such as cranes.

In an advantageous further development of the invention, the torque density of the drive unit consisting of high-speed electric motor and speed-reducing transmission can be in the range of 20 to 40 Nm/l or 25 to 30 Nm/l.

Advantageously, the electric motor can run at a speed of more than 4,000 rpm or even more than 8,000 rpm during operation of the machine component to be driven, and the motor speed can also be 12,000 rpm or more. The motor speed can be more than three times or even more than four times the speed required by the unit to be driven.

In order to reduce the very high engine speeds to a speed level typically achieved by hydrostats or hydraulic motors, the transmission can, in advantageous further development of the invention, have a transmission ratio of more than 3 or even more than 4, i.e. reduce the engine speed by a factor of more than 3 or more than 4. In particular, the transmission ratio of the transmission integrated into the drive unit can be 4 to 5 in an underdrive ratio.

Depending on the design of the machine component to be driven, a further transmission can be connected downstream, to which the output speed of the transmission integrated in the drive unit and thus the output speed of the drive unit is applied directly or indirectly, for example through a drive shaft. Even if the machine unit to be driven has its "own" transmission, the drive unit includes said speed-reducing transmission in order to be able to connect the drive unit as a replacement module for e.g. a hydrostat and to be able to provide the output speed for which the machine unit including the unit transmission is designed.

Advantageously, the transmission integrated in the drive unit, which reduces the speed of the electric motor running too fast to the desired output speed range, can be accommodated together with the electric motor in a common housing of the drive unit, which encloses the electric motor and the transmission unit at least on the circumferential side and advantageously also on the end face, so that essentially only the output shaft of the transmission unit protrudes from the housing. Notwithstanding such a common housing, the electric motor and the transmission can be housed in separate, preferably sealed, in particular liquid-tight housing chambers.

As an alternative to a common housing, however, the electric motor and the connected transmission can also have separate housing units that can preferably be connected to each other. Such separate motor and transmission housings allow the electric motor and transmission to be tested separately for functionality. In addition, any necessary repairs can be carried out more easily.

Advantageously, the housings and/or housing portions of the electric motor and transmission can have at least approximately the same diameter and/or the same cross-sectional dimensions, so that the drive unit composed of electric motor and transmission has an overall slim, preferably approximately smooth outer contour.

In order to enable installation of the drive unit even in very confined installation environments, such as the interior of the drum of a cable winches, it may be advantageous for the electric motor and the transmission connected thereto to be arranged coaxially with respect to one another in further development of the invention. In particular, the transmission output shaft can be arranged coaxially with the motor shaft.

In such a coaxial arrangement of electric motor and transmission, said transmission can advantageously be flanged to the electric motor at the end face, wherein in particular a transmission housing can be connected to the motor housing at the end face and/or can be connected thereto.

Advantageously, the design of the transmission and the electric motor connected to it can be such that the drive unit comprising the electric motor and the transmission has a length/diameter ratio of 2 to 4, i.e. is approximately two to four times as long as it is thick or wide.

Irrespective of the specific geometrical arrangement or dimensioning of the electric motor and the transmission, provision can be made for the electric motor and the transmission to have separate coolant circuits so that the electric motor and the transmission can be cooled by separate coolant flows. In an advantageous further development of the invention, however, provision can be made to cool the electric motor and the transmission in parallel from the same coolant flow or in series from the same coolant flow. However, with separate coolant circuits, a perfectly matching coolant circuit can be configured to the electric motor and the transmission and/or the corresponding coolant circuit can be controlled to match the heat generation in the electric motor or the transmission.

In particular, the electric motor and the transmission can be liquid-cooled, especially oil-cooled or water-cooled.

Regardless of the coolant, the cooling circuit of the electric motor may have a coolant inlet at the transmission-side end section of the electric motor, while an outlet of the motor cooling circuit may be provided at a motor section facing away from the transmission. This allows the part of the electric motor with the higher thermal load from the heat of the transmission to be cooled to a greater extent.

In order to achieve a sufficiently high speed reduction with a slim design, the transmission integrated in the drive unit can comprise at least one gear stage in coaxial design, e.g. a planetary gear stage.

When providing such a planetary gear stage, it may be advantageous if a planet carrier is arranged in an upright position, wherein the upright planet carrier may be firmly connected to and/or form part of a motor and/or transmission housing. Notwithstanding the above, the stationary planet carrier may include a bearing portion for rotatably supporting a transmission input shaft and/or the engine output shaft.

In principle, however, other transmission designs are also possible.

BRIEF DESCRIPTION OF THE DRAWINGS

The invention is explained in more detail below on the basis of a preferred exemplary embodiment and the corresponding drawings. The drawings show.

DETAILED DESCRIPTION

As shown in the figures, the drive unit 1 comprises a drive motor 2, which is configured as a high-speed electric motor, and a speed-reducing gear 3 connected thereto, which reduces the motor speed of the electric motor to the output speed of the drive unit 1.

Figure 3:
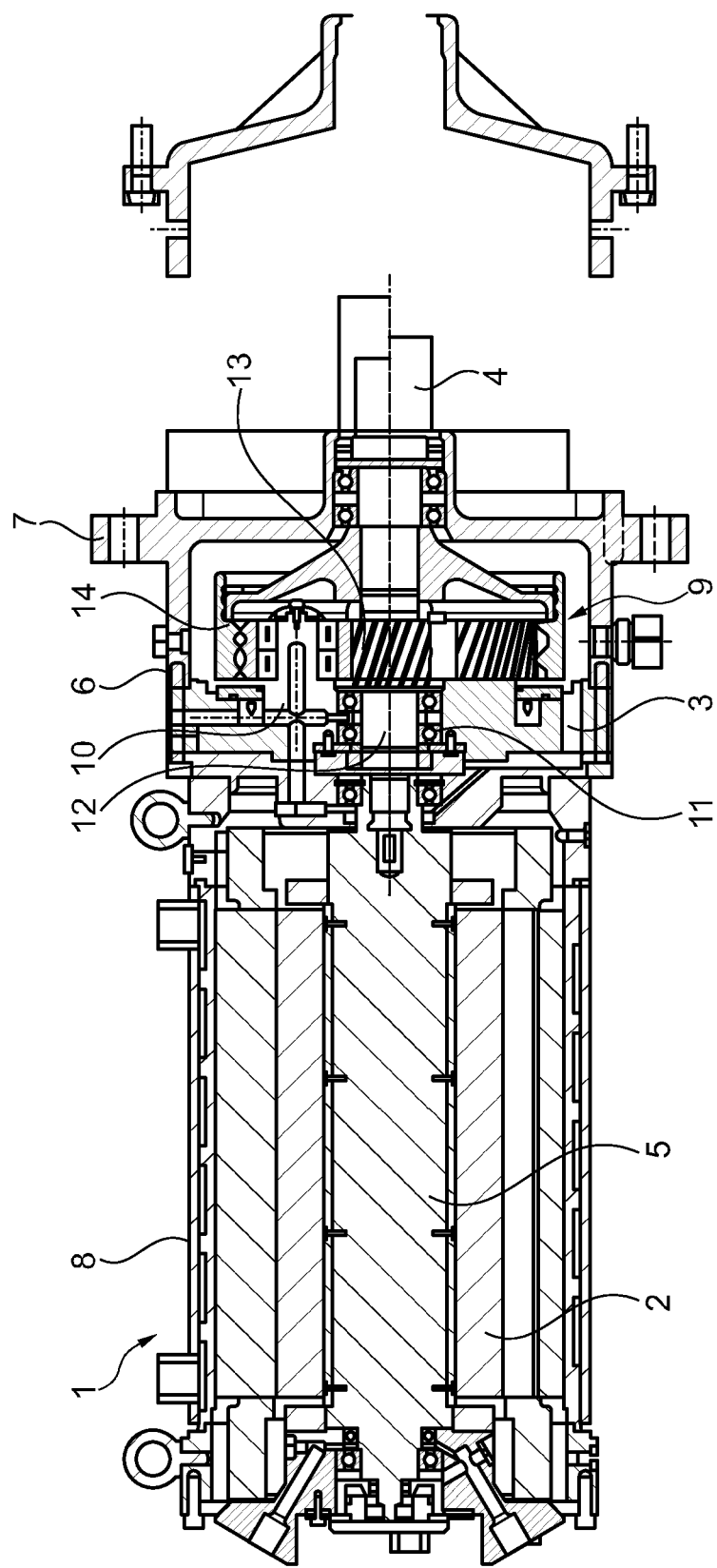
FIG. 3: shows a longitudinal portion through the drive unit from the previous figures, showing the frontal, coaxial connection of the transmission to the electric motor.

The drive motor 2 and the transmission 3 can advantageously be arranged coaxially to each other, whereby in particular the transmission output shaft 4 can be arranged coaxially to the motor shaft 5, cf. FIG. 3.

The transmission 3 may be housed in a—roughly speaking—cylindrical transmission housing 6, which may have a collar-shaped mounting flange 7 by means of which the drive unit 1 can be mounted on the installation environment of a machine unit to be driven.

The drive motor 2 may comprise a motor housing separate from the transmission housing 6, wherein the transmission housing 6 may be flanged to the motor housing 8 at the end face. As an alternative to separate motor and transmission housings, however, it would also be possible to accommodate the electric motor and the transmission in a common housing and/or to integrally form said transmission and motor housings 6 and 8.

Advantageously, the motor housing 8 and the transmission housing 6 can have at least approximately the same diameter, so that the drive unit 1 as a whole forms a slim, elongated, approximately cylindrical unit.

Figure 1:
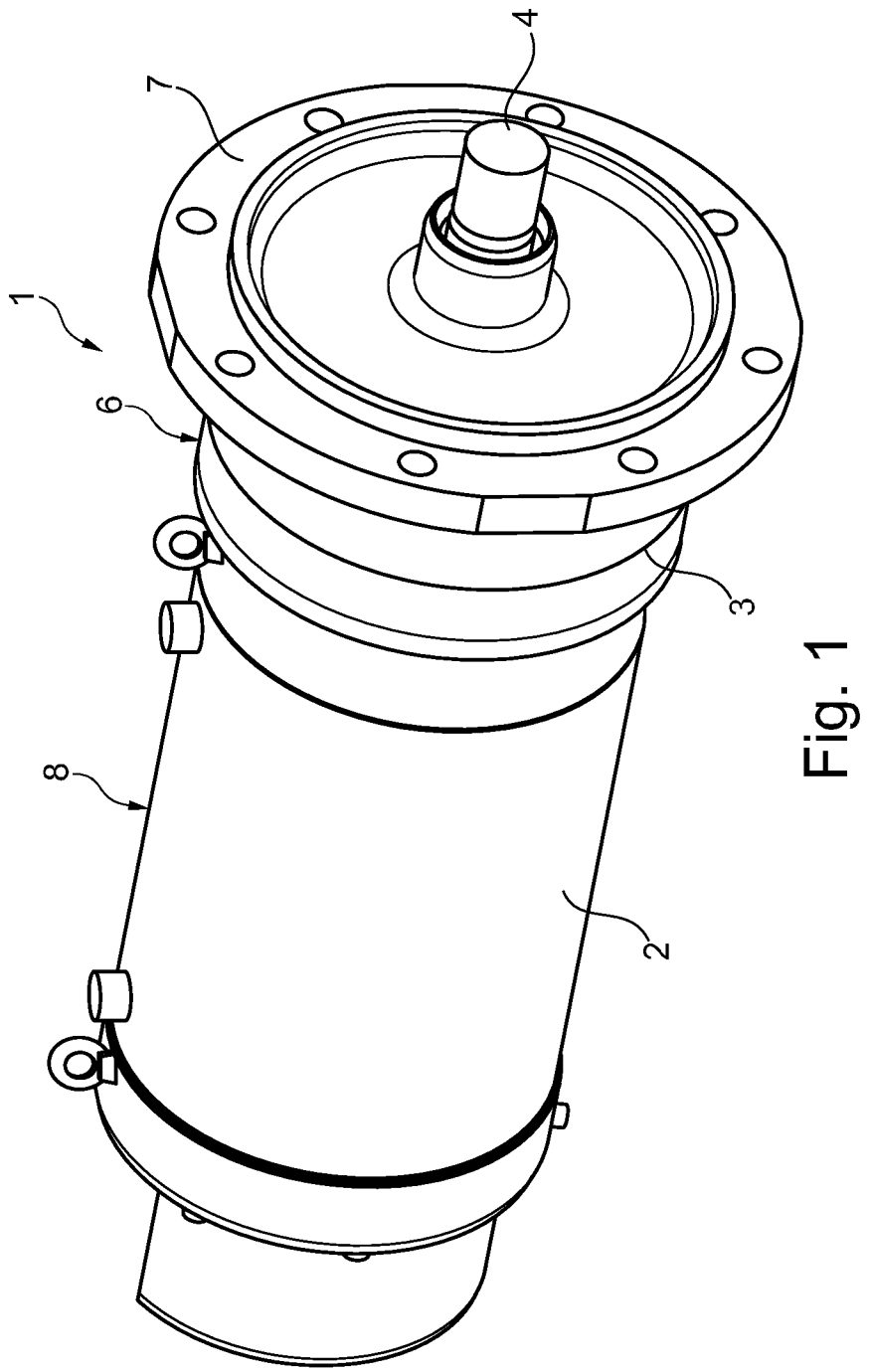
FIG. 1: shows a perspective view of a drive unit with a high-speed electric motor and a speed-reducing transmission according to an advantageous embodiment of the invention.
Figure 2:
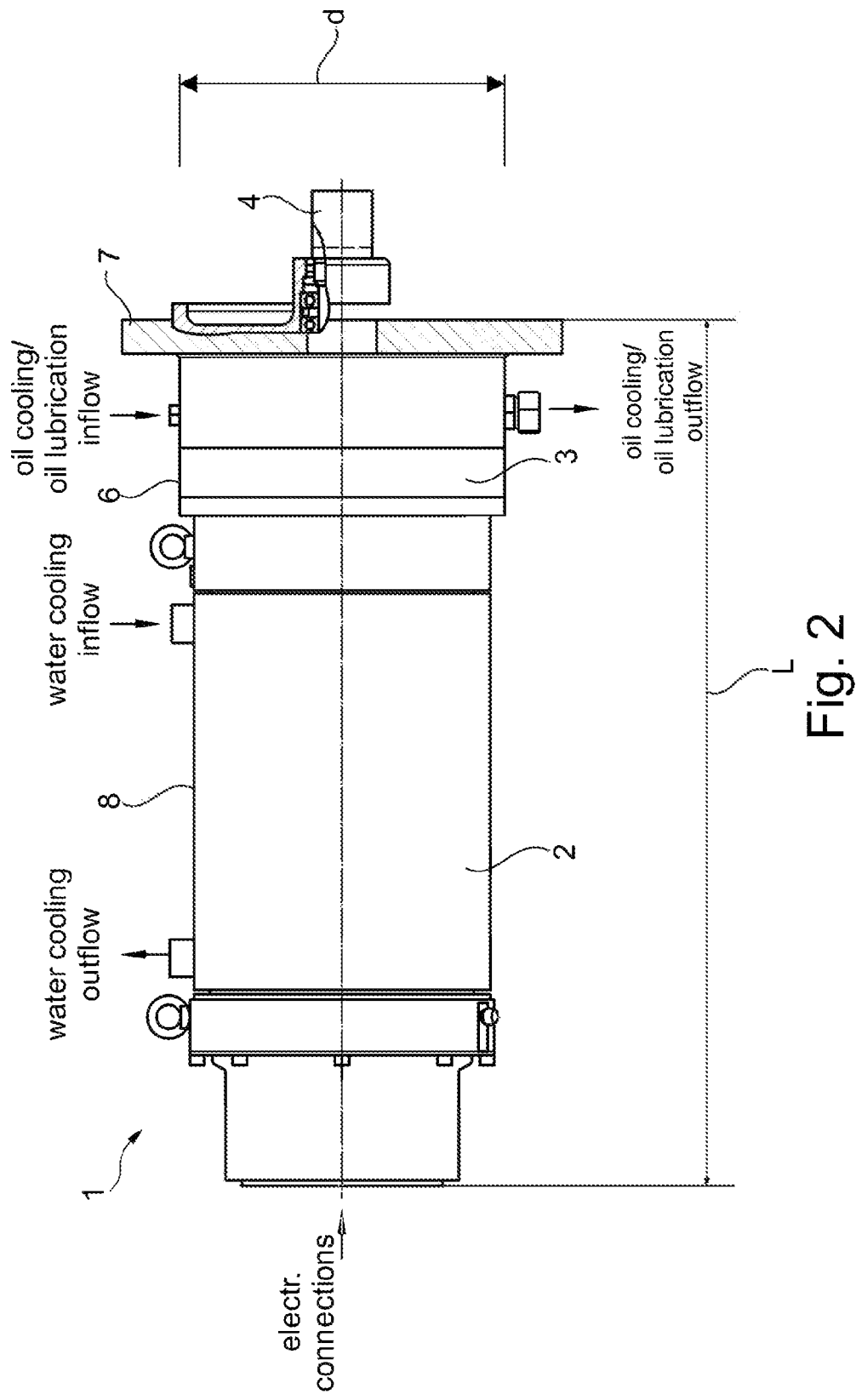
FIG. 2: shows a side view of the drive unit of FIG. 1, wherein the bearing of the output shaft is shown partially cut.

As FIG. 1 and FIG. 3 show, on one end face of the drive unit 1 the transmission output shaft 4 can project a little way out of the housing of the drive unit 1 in the manner of a stub shaft. Electrical connections for supplying and/or controlling the electric motor 2 can be provided on the opposite end face of the drive unit 1, see FIG. 3.

The electric motor can be of various designs, with synchronous and asynchronous motors basically being considered. For example, the electric motor can be a synchronous motor with permanent magnet.

The electric motor 2 is configured for a high speed range as intended, wherein a speed range of 4,000 to 20,000 rpm or 5,000 to 15,000 rpm or 8,000 to 12,000 rpm intended for working operation can be provided. The entire speed range can, of course, start at 0 and in this respect range from 0 to 20,000 rpm or 0 to 15,000 rpm in order to be able to start from standstill in working mode.

Advantageously, the electric motor has a maximum speed that is at least 10,000 rpm. Advantageously, the motor can be operated at speeds in the range from 8,000 to 16,000 rpm or 10,000 to 14,000 rpm.

The transmission 3 connected to the electric motor 2 advantageously has a transmission ratio of more than 2 or even more than 3, wherein the transmission ratio can advantageously be 4 to 5. The motor speed of the electric motor 2 is thus reduced by at least a factor of 2 or a factor of 3, in particular by a factor of 4 to 5, so that the output speed can be in the range of ½ to ⅕ of the motor speed. For example, if the electric motor runs at the speed of 14,000 rpm, the output speed of the drive unit 1, that is, the speed of the transmission output shaft 4 is approximately 3,000 If the electric motor 2 can be run at a speed range of zero to 14,000, the output speed of the drive unit 1 is zero to 3,000.

In order to be able to achieve said transmission ratio with a slim design, the transmission 3 can comprise at least one planetary gear stage 9. As FIG. 3 shows, such a planetary gear stage 9 may comprise an upright planet carrier 10, which may be rigidly connected to the motor housing 8 and/or the transmission housing 6. Advantageously, said planet carrier 10 can carry or support a pivot bearing 11 on which the motor shaft 5 and/or a transmission input shaft 12 is supported.

As FIG. 3 shows, the sun gear 13 may be rotationally fixed to the transmission input shaft 12 and in rolling engagement with the planets rotatably mounted on the planet carrier 10. A ring gear 14, which is in rolling engagement with the planet gears, can drive the transmission output shaft 4, in particular be connected to it in a rotationally fixed manner.

The drive unit 1 comprising the electric motor 2 and the transmission 3 may have a torque density of more than 20 Nm/l, for example a torque density of 20 to 40 or 25 to 30 Nm/l.

The drive unit 1 can provide a torque of, for example, more than 500 Nm or more than 1,000 Nm, for example in a range of 500 to 2,000 Nm or 1,000 to 1,500 Nm. Advantageously, however, the drive unit 1 can also start up very gently and also provide small torques starting at 0, which can then be raised to the level mentioned in the desired manner.

We claim:

1. A drive unit for a construction and/or material handling machine or lifting equipment such as a crane, the drive unit comprising:
    a torque density of more than 20 Nm/l at a predetermined output speed, wherein the drive unit comprises a drive motor and a connected transmission, wherein the drive motor comprises an electric motor having a motor speed that is at least two times the predetermined output speed of the drive unit and that is reduced by the connected transmission by a factor of at least 2 to an output speed of the drive unit, and
    wherein the coolant circuit has an inlet at a transmission-side end portion of the electric motor and a coolant outlet at an end portion of the electric motor facing away from the connected transmission.

2. The drive unit of claim 1, wherein the torque density of the drive unit is in the range of 20 to 40 Nm/l or 25 to 30 Nm/l and an engine speed in working operation is more than 4,000 rpm or more than 8,000 rpm or more than 12,000 rpm.

3. The drive unit of claim 1, wherein the electric motor has a speed range of 0 to 5,000 rpm or 0 to 10,000 rpm or 0 to 15,000 rpm.

4. The drive unit of claim 1, wherein the transmission has a transmission ratio of more than 3 in an underdrive ratio.

5. The drive unit of claim 1, wherein the transmission and the electric motor are arranged coaxially to each other, wherein the drive motor comprises a motor shaft, wherein the transmission comprises a transmission output shaft, and wherein the motor shaft is coaxial to a transmission output shaft.

6. The drive unit of claim 5, wherein the transmission is flanged to the electric motor at the end face.

7. The drive unit of claim 1, wherein the drive motor comprises a motor housing, and wherein the transmission comprises a transmission housing, and wherein the motor housing and the transmission housing have approximately the same diameter.

8. The drive unit of claim 7, wherein the motor housing is separate from the transmission housing and the motor and transmission housings are rigidly, releasably connectable to each other.

9. The drive unit of claim 7, wherein the transmission and the electric motor are in a common housing and the motor housing and transmission housing are integrally connected to one another in one homogeneous piece.

10. The drive unit of claim 1, wherein the drive unit has a length/diameter ratio (L/d) in the range of 2 to 4.

11. The drive unit according to claim 1, wherein the drive motor and the transmission have a common coolant circuit.

12. The drive unit of claim 11, wherein the transmission and the electric motor are liquid-cooled.

13. The drive unit of claim 1, wherein the connected transmission comprises a coaxial transmission stage.

14. A drive unit of claim 1, wherein the drive unit has a collar-shaped mounting flange for attachment to a machine unit to be driven, wherein the mounting flange is at a frontal transmission housing end portion.

15. A drive set comprising the drive unit of claim 1 and a hydraulic drive, wherein the drive unit and the hydraulic drive have corresponding connection flanges and have torque densities that differ from each other by less than 30%.

16. A drive unit for a construction and/or material handling machine or lifting equipment such as a crane, the drive unit comprising:
- a torque density of more than 20 Nm/l at a predetermined output speed, wherein the drive unit comprises a drive motor and a connected transmission, wherein the drive motor comprises an electric motor having a motor speed that is at least two times the predetermined output speed of the drive unit and that is reduced by the connected transmission by a factor of at least 2 to an output speed of the drive unit, wherein the connected transmission comprises a coaxial transmission stage; and
- an upright planet carrier fixedly connected to a motor and/or transmission housing, and wherein the upright carrier carries a pivot bearing for a transmission input shaft and/or a motor shaft.

17. The drive unit of claim 16, wherein the coolant circuit has an inlet at a transmission-side end portion of the electric motor and a coolant outlet at an end portion of the electric motor facing away from the connected transmission.

18. A method for using a drive unit for replacement with a hydraulic drive for driving a machine unit of a construction and/or material handling machine or lifting equipment, wherein the drive unit comprises:
- a torque density of more than 20 Nm/l at a predetermined output speed, wherein the drive unit comprises a drive motor and a connected transmission, wherein the drive motor comprises an electric motor having a motor speed that is at least two times the predetermined output speed of the drive unit and that is reduced by the connected transmission by a factor of at least 2 to an output speed of the drive unit.

19. A drive set comprising a drive unit and a hydraulic drive, wherein the drive unit and the hydraulic drive have corresponding connection flanges and have torque densities that differ from each other by less than 50%, and wherein the drive unit comprises:
- a torque density of more than 20 Nm/l at a predetermined output speed, wherein the drive unit comprises a drive motor and a connected transmission, wherein the drive motor comprises an electric motor having a motor speed that is at least two times the predetermined output speed of the drive unit and that is reduced by the connected transmission by a factor of at least 2 to an output speed of the drive unit.

* * * * *